US008745835B2

(12) United States Patent
Cutting et al.

(10) Patent No.: US 8,745,835 B2

(45) Date of Patent: Jun. 10, 2014

(54) LOCK STRIKER ALIGNMENT CHECK FIXTURE

(75) Inventors: Charles Cutting, Taylor, MI (US); Mark Brian, Madison, MS (US)

(73) Assignee: Nissan North America, Inc., Franklin, TN (US)

( * ) Notice: Subject to any disclaimer, the term of this patent is extended or adjusted under 35 U.S.C. 154(b) by 126 days.

(21) Appl. No.: 13/416,084

(22) Filed: Mar. 9, 2012

(65) Prior Publication Data

US 2013/0232754 A1 Sep. 12, 2013

(51) Int. Cl.
*B23Q 17/00* (2006.01)
*G01D 21/00* (2006.01)

(52) U.S. Cl.
USPC ......... 29/407.09; 29/407.05; 29/464; 33/600; 33/645

(58) Field of Classification Search
USPC ............ 29/464, 407.09, 468; 72/458; 81/484; 33/600, 608, 645
See application file for complete search history.

(56) References Cited

U.S. PATENT DOCUMENTS 4,930,337 A * 6/1990 Schaap ........................... 72/458
5,282,305 A 2/1994 Nutt et al.
5,562,001 A * 10/1996 Bell ................................ 72/458
5,694,675 A 12/1997 Pasternak et al.
5,979,952 A 11/1999 Dering et al.
6,098,265 A 8/2000 Stojkovic et al.
6,138,337 A * 10/2000 Lezuch et al. ............ 29/407.05
6,209,186 B1 4/2001 Hui et al.
6,324,948 B1 * 12/2001 Kavc et al. ...................... 81/484
6,334,264 B1 1/2002 Oh

FOREIGN PATENT DOCUMENTS

JP 54005276 1/1979
JP 60155328 8/1985

* cited by examiner

*Primary Examiner* — David Bryant
*Assistant Examiner* — Jun Yoo
(74) *Attorney, Agent, or Firm* — Young, Basile, Hanlon & MacFarlane, P.C.

(57) ABSTRACT

A door lock striker alignment check fixture includes a check fixture body having a tapered region engageable with a striker receiving slot of a door latch mechanism. The check fixture body defines an elongated slot for receiving a door striker. The door lock striker alignment check fixture further includes a flange fixedly attached to the check fixture body, and which is engageable with an exterior surface of a vehicle door coupled to the door latch mechanism. The flange includes a contact surface that contacts the exterior surface of the vehicle door and which faces an insertion direction of the tapered region with respect to the striker receiving slot.

18 Claims, 6 Drawing Sheets

LOCK STRIKER ALIGNMENT CHECK FIXTURE

BACKGROUND

Automotive vehicles, such as automobiles and trucks, generally include one or more doors pivotally mounted by hinges to a vehicle door frame for movement between an open position and closed position. The hinges support the weight of the door in addition to enabling the door to pivot. A latch system is typically employed for securing the door in the closed position. The latch system may include a latch assembly mounted to and edge of the door and a striker plate attached to a door frame in the vehicle body. The latch assembly typically includes a latch plate that releasably engages the striker plate when the door is arranged in the closed position.

To help ensure proper operation of the latch system, the striker assembly should be suitably aligned with the latch assembly. Problems may arise in closing the door when the latch assembly and striker assembly are misaligned. Such misalignment can result from damage to the door or merely from the weight of the door. Flexing of the vehicle body may also lead to misalignment of the latch and striker assemblies. If the latch plate of the latch assembly is misaligned relative to a striker rod of the striker assembly, closing the door may become difficult. Misalignment may also detrimentally affect opening of the door. Although a small amount of misalignment may not affect latching of the door, it may give the impression of poor vehicle quality if a person operating the door senses the striker rod contacting the latch assembly as the door is closed. Thus, it is desirable to minimize misalignment between the latch assembly and the striker assembly.

SUMMARY

The disclosed embodiments include a door lock striker alignment check fixture for checking alignment between a door latch assembly attached to a vehicle door and a striker assembly attached to a vehicle body. In one embodiment, the door lock striker alignment check fixture includes a check fixture body having a tapered region engageable with a striker receiving slot of the door latch mechanism. The check fixture body defines an elongated slot for receiving a door striker associated with the striker assembly. The door lock striker alignment check fixture further includes a flange fixedly attached to the check fixture body for engaging an exterior surface of the vehicle door adjacent the door latch mechanism. A simulated striker member extends from a distal end of the check fixture body opposite the elongated slot, and engages a latch plate associated with the latch mechanism when the door lock striker alignment check fixture is engaged with the door latch mechanism.

The door lock striker alignment check fixture may be used to check alignment between the door latch assembly and the striker assembly by inserting the door striker alignment check fixture into a striker receiving slot of the door latch mechanism so as to engage the tapered region of the check fixture with the striker receiving slot of the door latch mechanism and the flange of the check fixture with the exterior surface of the vehicle door. The vehicle door may then be moved from an open position toward a closed position such that the check fixture body engages the door striker proximate the elongated slot. An operator may monitor engagement of the check fixture body with the door striker in order to detect interference between the door striker and a peripheral edge of the elongated slot, and take corrective action, if necessary, to adjust a position of the door striker in response to detecting interference between the door striker and the elongated slot.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
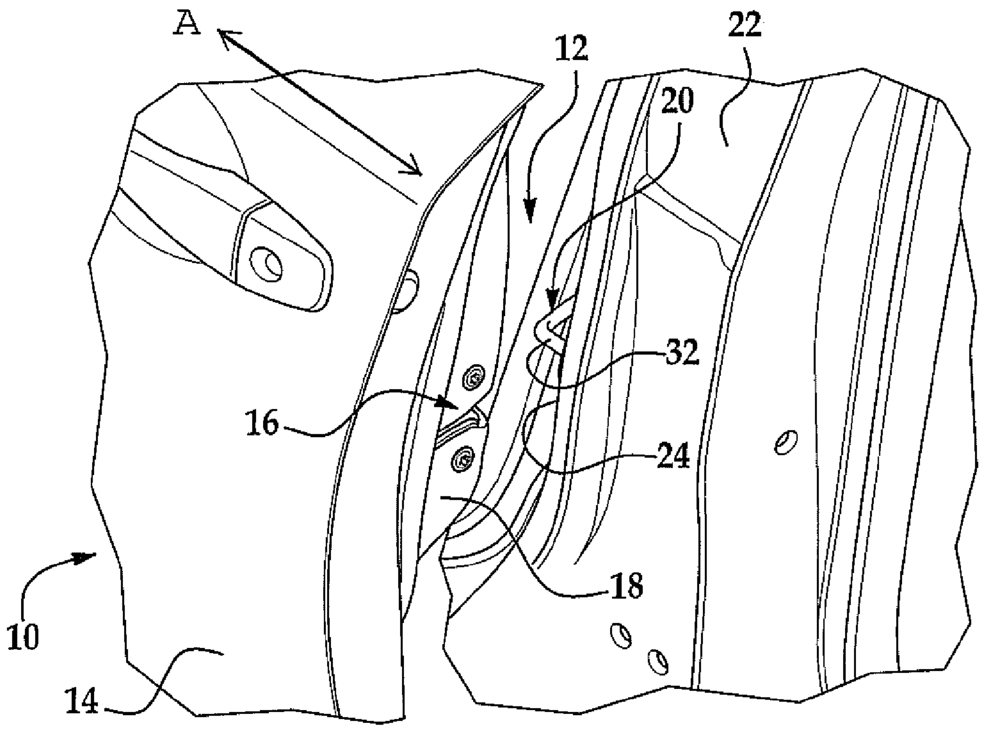
FIG. 1 is a partial side view of an automotive vehicle with a vehicle door illustrated in a partially open position.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present invention. Further, the descriptions set forth herein are not intended to be exhaustive or otherwise limit or restrict the claims to the precise forms and configurations shown in the drawings and disclosed in the following detailed description.

With reference to FIGS. 1 thru 4, a vehicle 10 may include a latch system 12 for securing a vehicle door 14 in a closed position. Latch system 12 may include a latch assembly 16 mounted to an edge 18 of vehicle door 14, and a striker assembly 20 mounted to a body 22 of vehicle 10 along a door frame 24.

Figure 4:
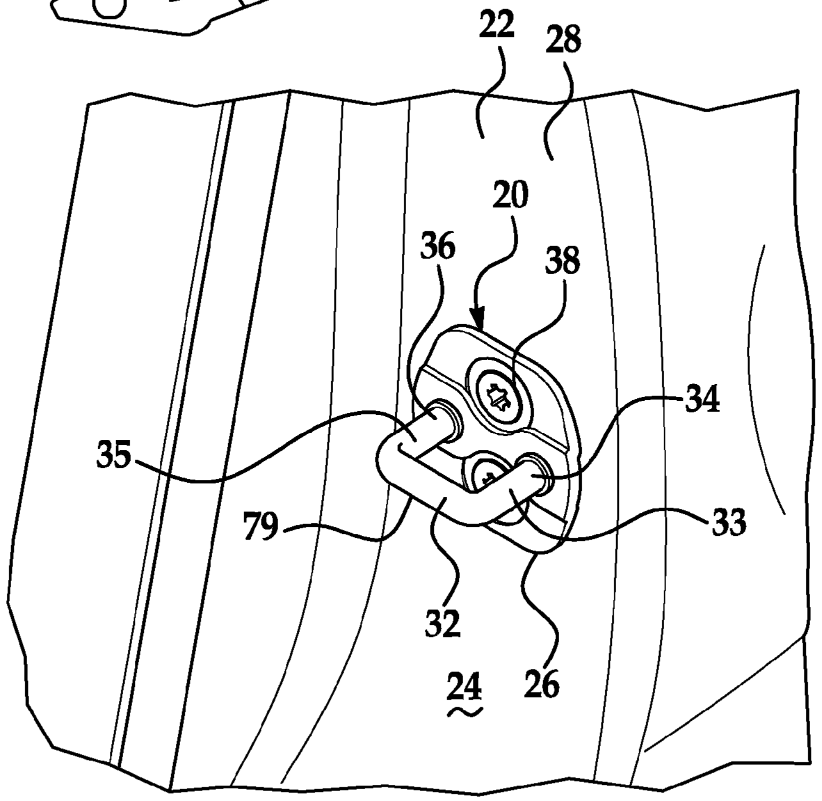
FIG. 4 is a perspective view of a door striker attached to a door frame of a vehicle body.

With continued reference to FIG. 4, striker assembly 20 may include a mounting plate 26 arranged flatwise on a wall 28 of door frame 24. Extending outward from mounting plate 26 is a generally U-shaped striker rod 32 having a leading leg 33 and a trailing leg 35. An end 34 of leading leg 33 and an end 36 of trailing leg 35 are suitably attached to mounting plate

26. Mounting plate 26 may be adjustably mounted to wall 28 of door frame 24 using one or more fasteners 38 that pass through corresponding apertures in mounting plate 26. Fasteners 38 may extend through elongated slots in wall 28 of door frame 24 and threadably engage corresponding nuts arranged on a concealed backside of wall 28 opposite mounting plate 26. The nuts may be captured within a slot formed on the concealed backside of wall 28, which allows the nuts to be moved lengthwise along the slots in wall 28. The elongated slots and movable nuts enable the position of striker assembly 20 to be adjusted to align striker rod 32 with latch assembly 16 in vehicle door 14. Alternatively, the elongated slots may be formed in mounting plate 26, rather than wall 28 of door frame 24. Mounting plate 26 may be attached to wall 28 of door frame 24 by passing fasteners 38 through the elongated slots in mounting plate 26 and threadably engaging the fasteners with corresponding threaded apertures in wall 28. The elongated slots in mounting plate 26 would perform a similar function as the elongated slots in wall 28, and enable striker rod 32 to be aligned relative to latch assembly 16 in vehicle door 14. With striker rod 32 aligned relative to latch assembly 16, striker assembly 20 may be fixedly secured to wall 28 by tightening fasteners 38 to a desired torque.

Figure 2:
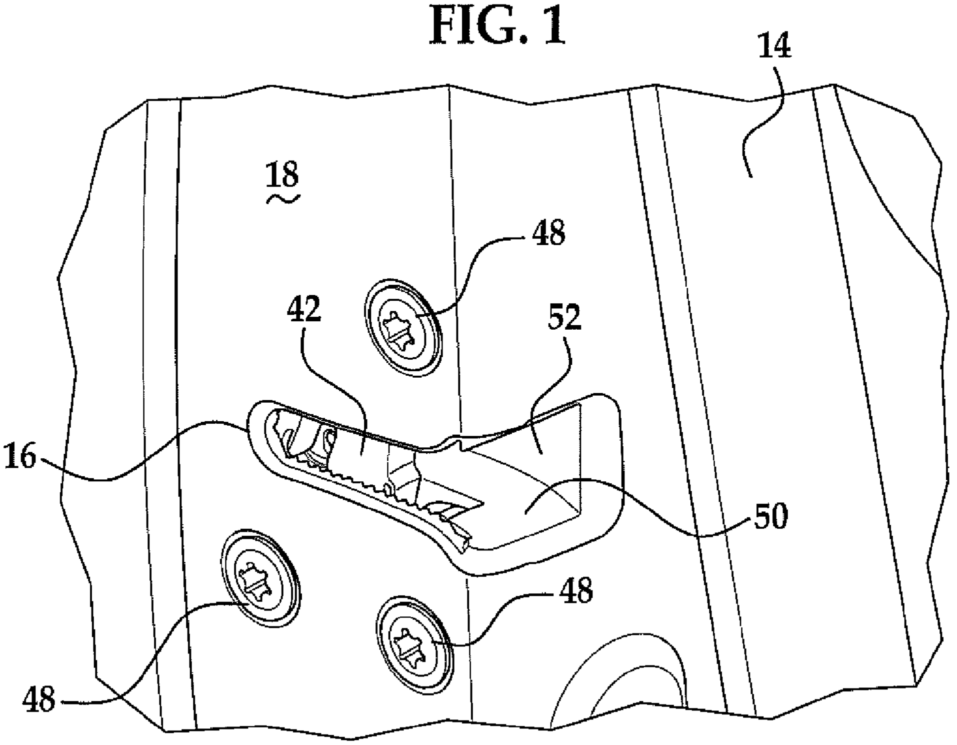
FIG. 2 is a partial perspective view of the vehicle door illustrating a latch mechanism.
Figure 3:
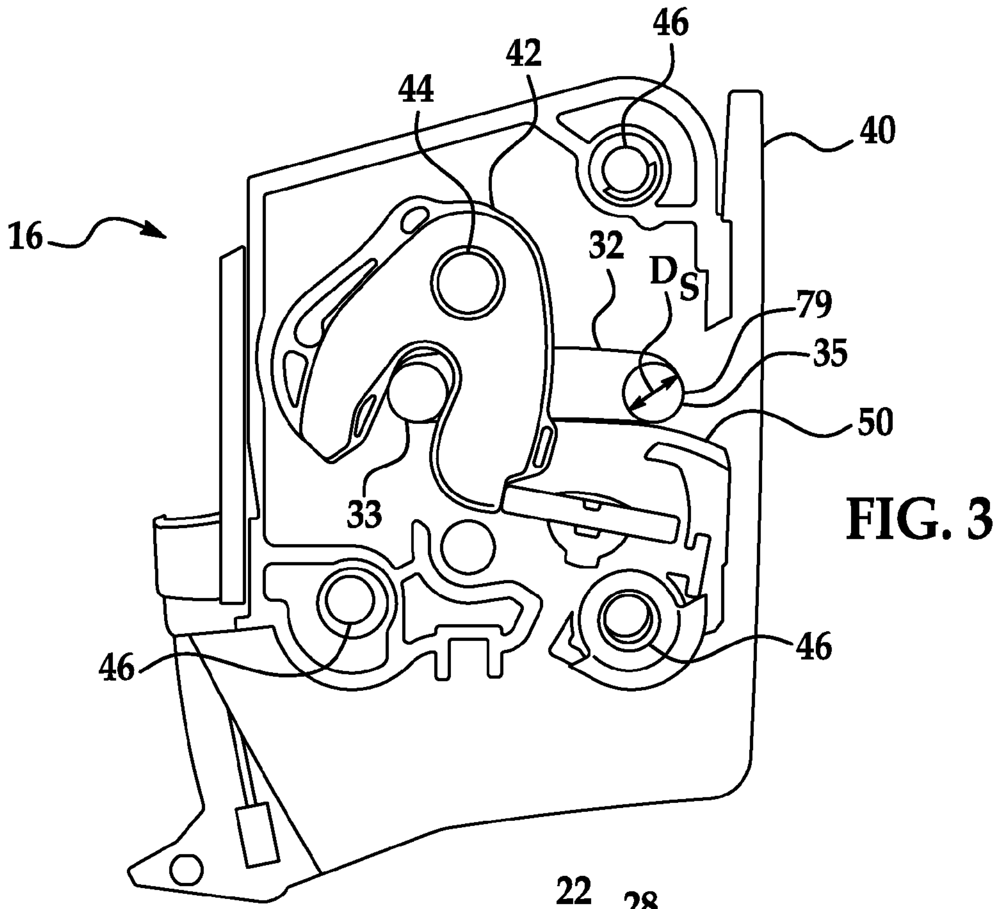
FIG. 3 is a partial cross-sectional view of the latch mechanism.

With continued reference to FIGS. 2 and 3, latch assembly 16 includes a latch housing 40 for pivotally supporting a latch plate 42 mounted on a latch pivot shaft 44. Mounting holes 46 are provided in the latch housing 40 for attaching latch assembly 16 to vehicle door 14 using one or more fasteners 48. Positioned within latch housing 40 is a contoured striker plate 50 that at least partially defines a tapered striker receiving slot 52 for guiding striker rod 32 into engagement with latch plate 42 as vehicle door 14 is moved into the closed position. Latch plate 42 pivots clockwise (when viewed from the perspective of FIG. 3) around latch pivot shaft 44 from an open position to a closed position as leading leg 33 of striker rod 32 is moved laterally into latch assembly 16 and engagement with latch plate 42 when vehicle door 14 is pivoted to the closed position. Latch plate 42 is illustrated in the closed position in FIGS. 2 and 3. Latch plate 42 pivots counterclockwise (when viewed from the perspective of FIG. 3) around latch pivot shaft 44 from the closed position to the open position to allow door 14 to move to the open position and disengage leading leg 33 of striker rod 32 from latch plate 42.

Figure 5:
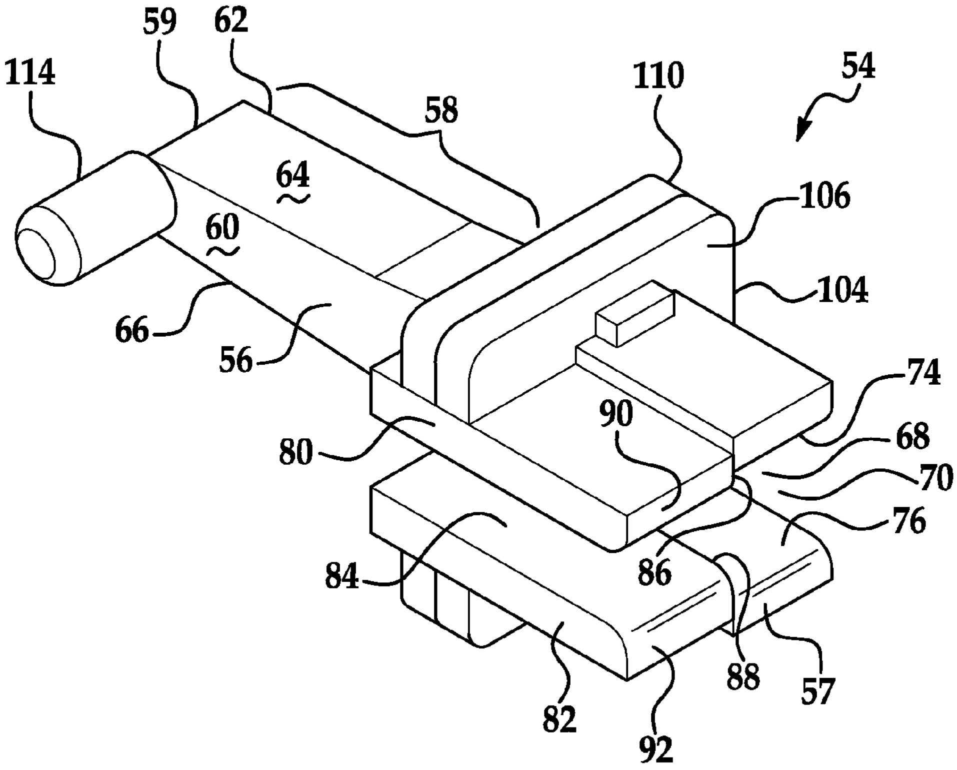
FIG. 5 is a perspective view of a an exemplary door striker alignment check fixture.
Figure 6:
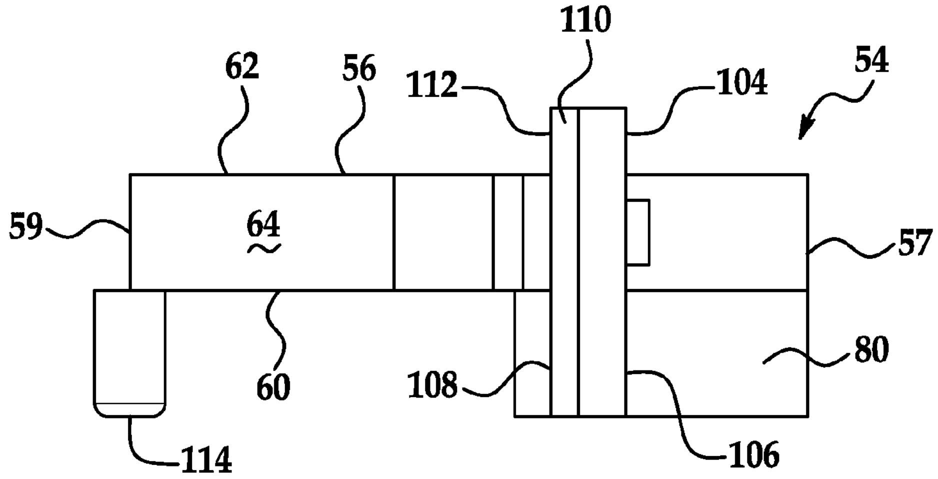
FIG. 6 is a top view of the door striker alignment check fixture.
Figure 7:
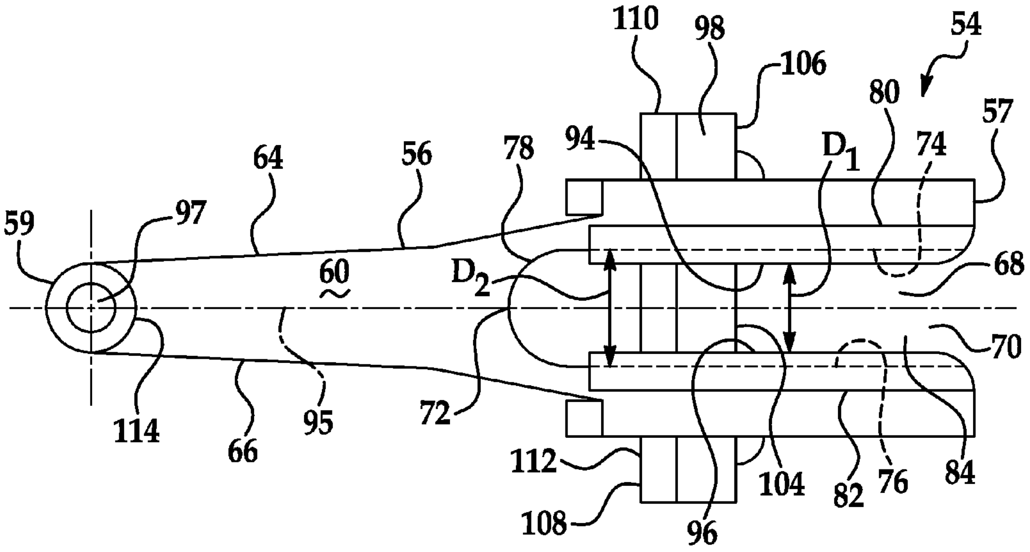
FIG. 7 is a side view of the door striker alignment check fixture.

If striker rod 32 is misaligned relative to latch assembly 16, full or complete closure of vehicle door 14 in door frame 24 may become difficult, due to striker rod 32 not being cleanly received within tapered recess 52 of latch assembly 16. With reference to FIGS. 5-7, a striker alignment check fixture 54 may be employed to check alignment between striker rod 32 and latch assembly 16. Striker alignment check fixture 54 engages latch assembly 16 and provides visual and tactile feedback to an operator as door 14 is moved from the open position toward the closed position and into engagement with striker rod 32 that can be used to determine if a misalignment condition exists. If misalignment is detected, the operator can take corrective action to realign striker rod 32 with respect to latch assembly 16.

With continued reference to FIGS. 5-7, striker alignment check fixture 54 may include an elongated check fixture body 56 having a proximal end 57 and an opposite distal end 59. Check fixture body 56 includes a tapered region 58 (FIG. 5) engageable with striker receiving slot 52 in latch assembly 16. Tapered region 58 may have a generally rectangular cross-sectional shape defined by four surfaces 60, 62, 64 and 66. Surfaces 60 and 62 are arranged opposite one another and extend between surfaces 64 and 66. Similarly, surfaces 64 and 66 are arranged opposite one another and extend between surfaces 60 and 62. Surfaces 60 and 62 may be generally planar surfaces extending parallel to a longitudinal axis of check fixture body 56. Alternatively, surfaces 60 and 62 may be contoured, for example, to provide clearance between striker alignment check fixture 54 and latch assembly 16 to enable the check fixture to fully engage the latch assembly. Surfaces 64 and 66 may be inclined relative to one another and form a generally wedge shape when viewed from the perspective of FIG. 7. Surfaces 64 and 66 may be contoured to generally correspond to the surface contour of striker receiving slot 52 in latch assembly 16.

Check fixture body 56 at least partially defines an elongated slot 68 having an open end 70 and an opposite closed end 72. A pair of opposing side walls 74 and 76 define sides of elongated slot 68. A generally curved end surface 78 extends between opposing side walls 74 and 76 to define closed end 72 of elongated slot 68. Curved end surface 78 may be contoured to correspond to an outer surface 79 of door striker 32 (see FIG. 3).

Attached to check fixture body 56 adjacent elongated slot 68 is a pair of striker guide plates 80 and 82 defining opposite sides of a striker receiving slot 84 for receiving striker rod 32. Striker guide plates 80 and 82 extend outward from check fixture body 56. Striker guide plate 80 may be located adjacent side wall 74 of elongated slot 68 and attached to check fixture body 56 along a side edge 86. Similarly, striker guide plate 82 may be located adjacent side wall 76 of elongated slot 68 and attached to check fixture body 56 along a side edge 88. A proximal edge 90 of striker guide plate 80 and a proximal edge 92 of striker guide plate 82 may be arranged adjacent open end 70 of elongated slot 68. Proximal edges 90 and 92 may be chamfered or rounded to minimize damage to striker rod 32 in the event of misalignment between striker rod 32 and latch assembly 16.

An inside surface 94 of striker guide plate 80 and an inside surface 96 of striker guide plate 82 together define opposite sides of striker receiving slot 84. Striker guide plate surfaces 94 and 96 may be arranged generally parallel to one another and spaced apart a distance $D_1$ greater than a diameter $D_s$ (see FIG. 3) of striker rod 32. The distance $D_1$ between striker guide plates 80 and 82 is less than a distance $D_2$ between opposing sidewalls 74 and 76 of elongated slot 68.

With continued reference to FIGS. 5-7, striker alignment check fixture 54 may include a flange 98 fixedly attached to check fixture body 56. Flange 98 engages an exterior surface 100 of an inside panel 102 of vehicle door 14 (see FIG. 8) when striker alignment check fixture 54 is coupled to door latch assembly 16. Flange 98 helps position striker receiving slot 84 at a proper orientation relative to latch assembly 16. Flange 98 may have a generally C-shaped configuration with a middle leg 104 of the flange positioned adjacent a side of check fixture body 56 opposite striker guide plates 80 and 82. Flange 98 may be positioned lengthwise along check fixture body 56 between open end 70 and closed end 72 of elongated slot 68 and oriented substantially perpendicular to inside surfaces 92 and 94 of striker guide plates 80 and 82, respectively. Flange 98 may be fixedly attached to check fixture body 56 and striker guide plates 80 and 82 using any of various methods, including but not limited to, welding, brazing, soldering, gluing, as well as various fasteners, such as, for example, screws, bolts and rivets.

Flange 98 includes a proximal side surface 106 facing proximal end 57 of check fixture body 56, and a distal side surface 108 facing distal end 59 of check fixture body 56. To protect vehicle door 14 from possible damage when striker alignment check fixture 54 is engaged with latch assembly 16, a bumper pad 110 may be attached to distal side surface 108 of flange 98. Bumper pad 110 may be made of various materials, including but not limited to, rubber, elastomer, vinyl, and PVC, to name a few. Bumper pad 110 may be configured to be more deformable than exterior surface 100 of vehicle door 14 and flange 98. A contact surface 112 of bumper pad 110 faces distal end 59 of check fixture body 56 and engages exterior surface 100 of vehicle door 14 when striker alignment check fixture 54 is engaged with latch assembly 16.

With continued reference to FIGS. 5-7, striker alignment check fixture 54 may include a simulated striker member 114 fixedly attached to distal end 59 of check fixture body 56. Simulated striker member 114 engages latch plate 42 when striker alignment check fixture 54 is inserted in latch assembly 16. Simulated striker member 114 and striker receiving slot 84 are arranged at opposite ends of check fixture body 56, with tapered region 58 disposed between simulated striker member 114 and striker receiving slot 84. A longitudinal center axis of the striker receiving slot 84 and a longitudinal center axis of the tapered region 58 of the check fixture body 56 may be aligned substantially along a common plane 95 coinciding with a longitudinal axis 97 of simulated striker member 114.

Striker alignment check fixture 54 may be constructed from a substantially rigid material, such as, for example, steel, aluminum, composites, and plastics, to help maintain a fixed relative positioning between striker receiving slot 84, tapered region 58 of check fixture body 56 and simulated striker member 114.

Figure 8:
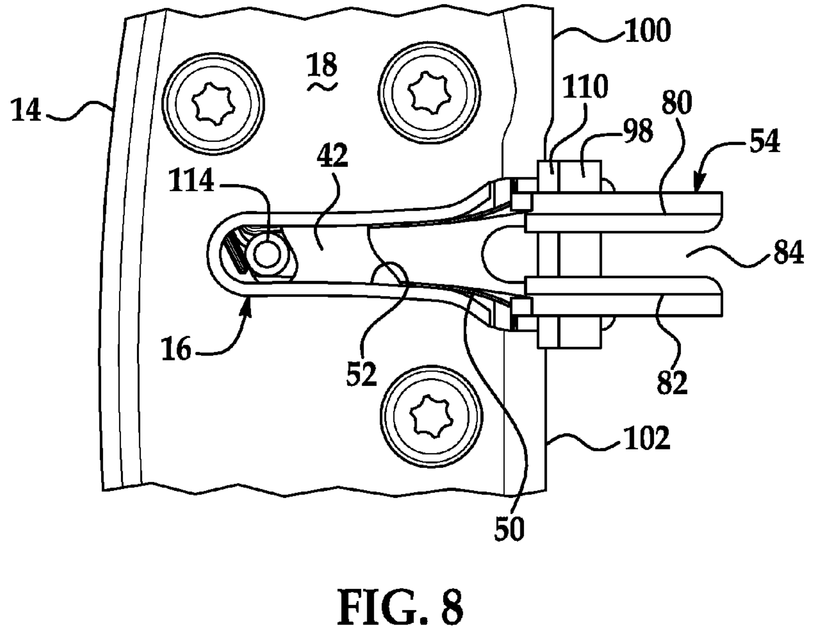
FIG. 8 is an end view of the vehicle door with the door striker alignment check fixture engaging the door latch mechanism.

With reference to FIG. 8, striker alignment check fixture 54 may engage latch assembly 16 to check alignment between striker rod 32 and latch assembly 16. This may be accomplished by positioning simulated striker member 114, located at distal end 59 of striker alignment check fixture 54, adjacent striker receiving slot 52 (see FIG. 2) in latch assembly 16. With striker alignment check fixture 54 positioned for engagement with latch assembly 16, simulated striker member 114 will be pointing generally in a direction towards edge 18 of vehicle door 14 (see FIG. 2), and striker guide plates 80 and 82 will be aligned generally parallel with striker plate 50 in latch housing 40 (see FIG. 2). Striker alignment check fixture 54 may be moved into engagement with latch assembly 16 by inserting tapered region 58 into striker receiving slot 52 of latch assembly 16 and engaging simulated striker member 114 with latch plate 42. Latch plate 42 pivots clockwise (when viewed from the perspective of FIG. 8) around latch pivot shaft 44 (see FIG. 3) from the open position to the closed position as simulated striker member 114 is moved laterally into latch assembly 16 and into engagement with latch plate 42. Striker alignment check fixture 54 is spaced inward from edge 18 of vehicle door 14, shown as a rear-facing surface of the door, in a longitudinal direction A (see FIG. 1) of the vehicle door when tapered region 58 of check fixture body 56 is engaged with striker receiving slot 52 in latch assembly 16. With striker alignment check fixture 54 fully inserted into latch assembly 16, bumper pad 110 will contact exterior surface 100 of inside door panel 102 of vehicle door 14, Striker alignment check fixture 54 may be disengaged from latch assembly 16 by actuating a door handle associated with latch assembly 16 to unlatch latch plate 42 and allow the latch plate to pivot counterclockwise (when viewed from the perspective of FIG. 7) around latch pivot shaft 44 to release simulated striker member 114, thereby allowing striker alignment check fixture 54 to be disengaged from latch assembly 16.

Referring to FIGS. 9 thru 12, with striker alignment check fixture 54 engaging latch assembly 16, alignment of striker rod 32 relative to latch assembly 16 may be checked by concurrently moving vehicle door 14 and striker alignment check fixture 54 towards the closed position, such that check fixture body 56 engages striker rod 32 proximate striker receiving slot 52. An operator may monitor engagement of check fixture body 56 with striker rod 32 in order to detect interference between striker rod 32 and proximal edges 90 and 92 of striker guide plates 80 and 82, respectively. The operator may employ various sensory processes, such as, for example, visual and tactile feedback, to detect interference between striker rod 32 and striker guide plates 80 and 82. If interference is detected, the operator may proceed to adjust the position of striker rod 32 in relation to latch assembly 16 to obtain improved alignment.

Figure 9:
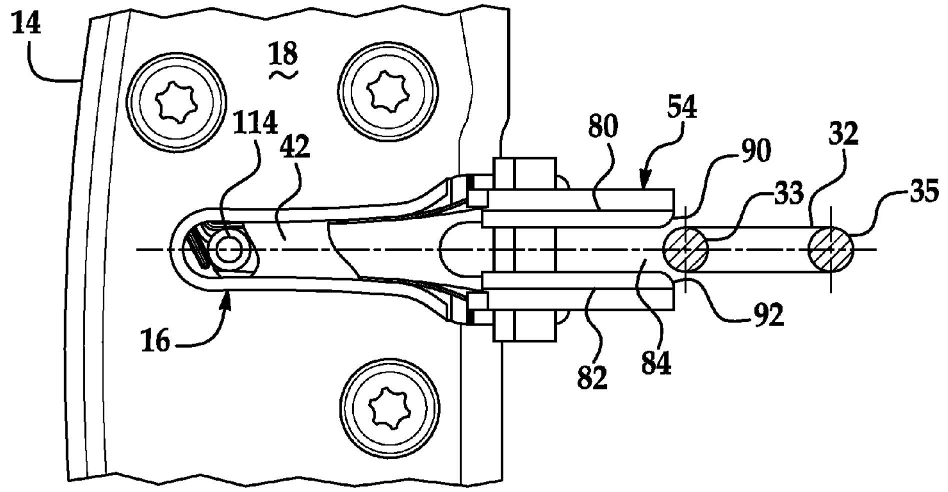
FIG. 9 is an end view of the vehicle door with the door striker alignment check fixture engaging the door latch mechanism and a properly aligned door striker positioned adjacent the check fixture.

With particular reference to FIG. 9, both legs 33 and 35 of striker rod 32 are shown substantially aligned with striker receiving slot 84 in striker alignment check fixture 54. In this example, moving vehicle door 14 and striker alignment check fixture 54 toward the closed position to engage striker rod 32 with striker receiving slot 84 will not cause interference between legs 33 and 35 of striker rod 32 and striker guide plate 80 and 82. This will allow striker rod 32 to be fully received within striker receiving slot 84, as illustrated, for example, in FIG. 12. By not detecting an interference the operator may conclude that striker rod 32 is suitably aligned with respect to latch assembly 16, and that no further corrective action is necessary.

Figure 10:
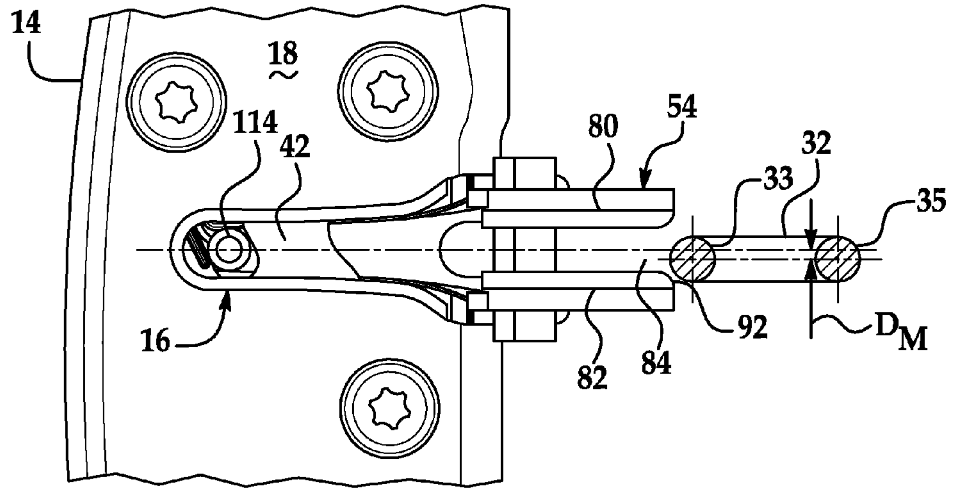
FIG. 10 is an end view of the vehicle door with the door striker alignment check fixture engaging the door latch mechanism and a misaligned door striker positioned adjacent the check fixture.
Figure 11:
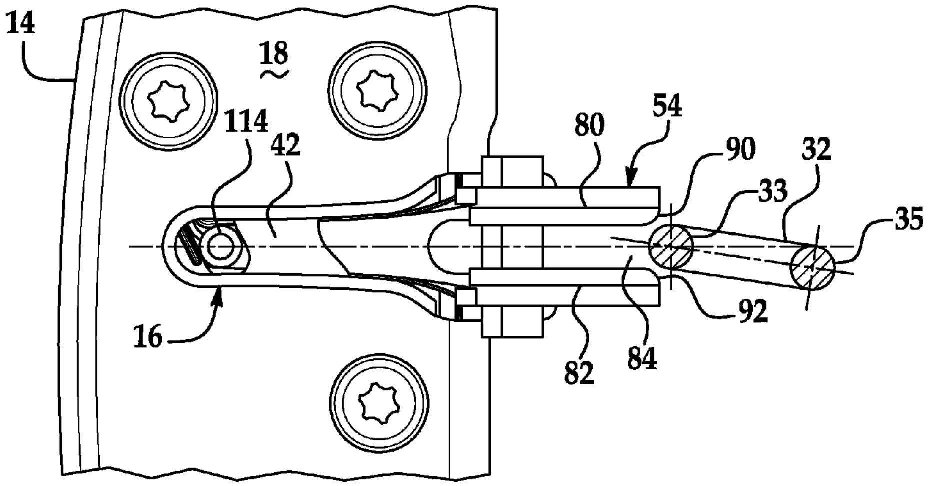
FIG. 11 is an end view of the vehicle door with the door striker alignment check fixture engaging the door latch mechanism and a misaligned door striker positioned adjacent the check fixture.
Figure 12:
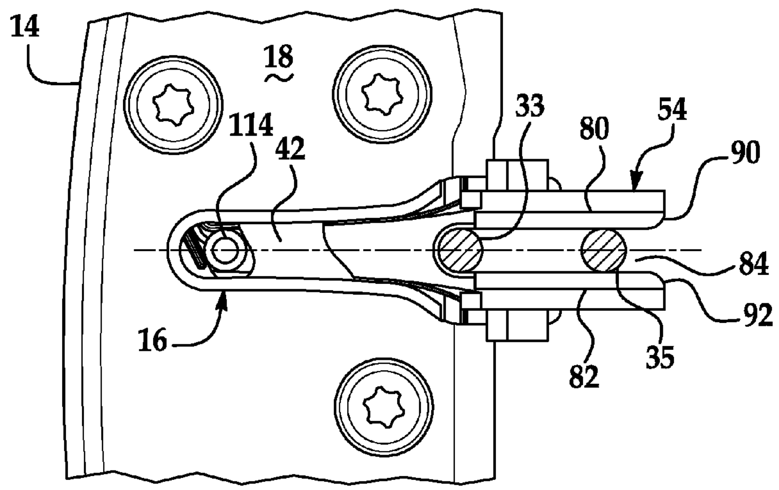
FIG. 12 is an end view of the vehicle door with the door striker alignment check fixture engaging the door latch mechanism and a properly aligned door striker engaging the check fixture.

In FIG. 10, both leading leg 33 and trailing leg 35 of striker rod 32 are shown misaligned by a distance $D_m$ relative to latch assembly 16. In this example, moving vehicle door 14 and striker alignment check fixture 54 toward the closed position will cause leading leg 33 of striker rod 32 to contact proximal edge 92 of striker guide plate 82. The operator may see and/or feel the interference as leading leg 33 of striker rod 32 tries to enter striker receiving slot 84 in striker alignment check fixture 54, but is hindered from doing so by the interference occurring between leading leg 33 of striker rod 32 and striker guide plate 82. In response to detecting the interference, the operator may proceed to adjust the position of striker rod 32 relative to latch assembly 16 in an effort to eliminate or minimize the interference. In this example, the operator would adjust striker assembly 20 in an upwardly direction to compensate for the misalignment. Alternatively, if the operator detected an interference between leading leg 33 of striker rod 32 and striker guide plate 89, the misalignment could be corrected by adjusting striker assembly 20 in a downwardly direction. Thus, assessing the cause of interference may assist the operator in determining the proper corrective action to remedy the misalignment.

In FIG. 10 both legs 33 and 35 of striker rod 32 are misaligned with respect to latch assembly 16. Striker alignment check fixture 54 may also be used to detect a misalignment of one of the legs, even when the other leg is properly aligned relative to latch assembly 16. In this example, leading leg 35 is properly aligned with respect to latch assembly 16 and will be received within striker receiving slot 84 of striker alignment check fixture 54 without interference as vehicle door 14 and striker alignment check fixture 54 are moved toward the closed position. Trailing leg 35, however is misaligned with respect to latch assembly 16, which will cause trailing leg 35 to contact proximal edge 92 of striker guide plate 82. The operator may see and/or feel the interference as trailing leg 35 of striker rod 32 tries to enter striker receiving slot 84 in striker alignment check fixture 54, but is hindered from doing so by the interference between trailing leg 35 of striker rod 32 and striker guide plate 82. In response to detecting the interference, the operator may determine that striker assembly 20 needs to be rotated counter-clockwise (as viewed from the perspective of FIG. 11) to correct the interference. Alternatively, if the operator detected an interference between trailing leg 35 of striker rod 32 and striker guide plate 80, the misalignment could be corrected by rotating striker assembly 20 clockwise (as viewed from the perspective of FIG. 11).

It is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary is made herein. In particular, use of the singular articles such as “a,” “the,” “said,” etc. should be read to recite one or more of the indicated elements unless a claim recites an explicit limitation to the contrary.

The foregoing description relates to what is presently considered to be the most practical embodiment. It is to be understood, however, that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A door lock striker alignment check fixture comprising:

a check fixture body including:

a tapered region engageable with a striker receiving slot of a door latch mechanism having a distal end;

an elongated slot opposite the distal end of the tapered region for receiving a door striker; and a simulated striker member engageable with a door latch assembly of the door latch mechanism, the simulated striker member extending from the tapered region proximate the distal end in a direction perpendicular to a longitudinal axis of the check fixture body and having a free end; and a flange fixedly attached to the check fixture body, the flange engageable with an exterior surface of a vehicle door coupled to the door latch mechanism, wherein a contact surface of the flange that contacts the exterior surface of the vehicle door faces an insertion direction of the tapered region with respect to the striker receiving slot, wherein the door lock striker alignment check fixture is configured to be spaced inward from a rear-facing surface of the vehicle door in a longitudinal direction from the rear surface-facing surface to a forward edge of the vehicle door when the tapered region of the check fixture body is engaged with the striker receiving slot of the door latch mechanism to prevent contact between the door lock striker alignment check fixture and a body of the vehicle.

2. The door lock striker alignment check fixture of claim 1, wherein a portion of the simulated striker member extends beyond the distal end of the tapered region along the longitudinal axis, so that the tapered region is disposed between the elongated slot and the portion of the simulated striker member.

3. The door lock striker alignment check fixture of claim 1, wherein a longitudinal center axis of the elongated slot and a longitudinal center axis of the tapered region of the check fixture body are aligned substantially along a common plane coinciding with a longitudinal axis of the simulated striker member.

4. The door lock striker alignment check fixture of claim 1, wherein the door lock striker alignment check fixture is configured to pivot with the vehicle door about a hinge axis such that the door striker is received within the elongated slot.

5. The door lock striker alignment check fixture of claim 1, wherein the elongated slot, the tapered region of the check fixture body, and the simulated striker member are positionally fixed relative to one another.

6. The door lock striker alignment check fixture of claim 1, wherein the elongated slot has an open end and a closed end proximate the tapered region, the closed end contoured to correspond to an outer surface of the door striker.

7. The door lock striker alignment check fixture of claim 1, wherein the flange contacts the exterior surface of the vehicle door at a peripheral edge defining an opening through which the check fixture body passes when the tapered region is engaged with the striker receiving slot.

8. The door lock striker alignment check fixture of claim 1, wherein the elongated slot is at least partially defined by a first surface and a second surface aligned substantially parallel to the first surface, a distance between the first and second surfaces being greater than a maximum thickness of the door striker and less than a minimum width of the striker receiving slot.

9. The door lock striker alignment check fixture of claim 1, where the flange further comprises an elastomeric pad positioned adjacent the contact surface of the flange, wherein the elastomeric pad is more deformable than both the exterior surface of the vehicle door and the contact surface of the flange.

10. The door lock striker alignment check fixture of claim 1, wherein the flange is positioned along a length of the check fixture body at a location configured to position a closed end of the elongated slot inside the striker receiving slot when the tapered region is engaged with the striker receiving slot.

11. A door lock striker alignment check fixture comprising:

a check fixture body including:

a tapered region engageable with a striker receiving slot of a door latch mechanism having a distal end;

an elongated slot opposite the distal end of the tapered region for receiving a door striker; and a simulated striker member engageable with a door latch assembly of the door latch mechanism, the simulated striker member extending from the tapered region proximate the distal end in a direction perpendicular to a longitudinal axis of the check fixture body and having a free end; and a flange fixedly attached to the check fixture body, the flange engageable with an exterior surface of a vehicle door coupled to the door latch mechanism, wherein a contact surface of the flange that contacts the exterior surface of the vehicle door faces an insertion direction of the tapered region with respect to the striker receiving slot, wherein the elongated slot includes an open end and a closed end, the flange positioned between the open end and the closed end of the elongated slot in a longitudinal direction of the tapered region.

12. A method for aligning a door lock striker with a door latch mechanism, the method comprising:

positioning a door striker alignment check fixture proximate a striker receiving slot of the door latch mechanism, the door striker alignment check fixture comprising a check fixture body and a flange fixedly attached to the check fixture body, the flange engageable with an exterior surface of a vehicle door coupled to the door latch mechanism, the check fixture body comprising: a tapered region engageable with the striker receiving slot and having a distal end, an elongated slot for receiving the door striker, and a simulated striker member engageable with a door latch assembly of the door latch mechanism, the simulated striker member extending from the tapered region proximate the distal end in a direction perpendicular to a longitudinal axis of the check fixture body and having a free end;

inserting the door striker alignment check fixture into the striker receiving slot of the door latch mechanism so as to engage the tapered region of the check fixture with the striker receiving slot of the door latch mechanism such that a contact surface of the flange that contacts the exterior surface of the vehicle door faces an insertion direction of the tapered region with respect to the striker receiving slot;

moving the vehicle door towards a closed position such that the check fixture body engages the door striker proximate the elongated slot;

monitoring engagement of the check fixture body with the door striker in order to detect interference between the door striker and a peripheral edge of the elongated slot; and adjusting a position of the door striker in response to detecting interference between the door striker and the elongated slot, wherein the door lock striker alignment check fixture is configured to be spaced inward from a rear-facing surface of the vehicle door in a longitudinal direction from the rear surface-facing surface to a forward edge of the vehicle door when the tapered region of the check fixture body is engaged with the striker receiving slot of the door latch mechanism to prevent contact between the door lock striker alignment check fixture and a body of the vehicle.

13. The method of claim 12, wherein the monitoring includes visually inspecting the check fixture body and the door striker to detect interference between the door striker and the check fixture body.

14. The method of claim 12, wherein the monitoring includes using tactile feedback to detect interference between the door striker and the check fixture body.

15. The method of claim 12, wherein the adjusting includes moving a fixed position of the door striker relative to the striker receiving slot.

16. The method of claim 12, wherein the moving includes pivoting the vehicle door about a hinge axis.

17. The method of claim 16, wherein the hinge axis of the vehicle door is a vertically oriented.

18. The method of claim 12 further comprising, before the inserting, adhering an elastomeric pad to the contact surface of the flange, wherein the elastomeric pad is more deformable that both the exterior surface of the vehicle door and the contact surface of the flange.

* * * * *